United States Patent [19]

Iwanaga

[11] Patent Number: 4,693,141

[45] Date of Patent: Sep. 15, 1987

[54] AUTOMATIC TRANSMISSION CASE

[75] Inventor: Kazuyoshi Iwanaga, Atsugi, Japan

[73] Assignee: Nissan Motor Co., Ltd., Yokohama, Japan

[21] Appl. No.: 4,241

[22] Filed: Jan. 5, 1987

Related U.S. Application Data

[63] Continuation of Ser. No. 595,523, Mar. 30, 1984, abandoned.

[30] Foreign Application Priority Data

May 25, 1983 [JP] Japan ................................ 58-78624

[51] Int. Cl.⁴ ............................................. F16H 57/02
[52] U.S. Cl. .................................................. 74/606 R
[58] Field of Search ................. 74/606 R, 730, 752 A, 74/752 D, 752 C

[56] References Cited

U.S. PATENT DOCUMENTS

| | | | |
|---|---|---|---|
| 3,613,481 | 10/1971 | Lapinski | 74/606 R |
| 3,747,196 | 7/1973 | Whittington | 74/606 |
| 4,210,034 | 7/1980 | Younger | 74/606 R |
| 4,271,721 | 6/1981 | Yamamori et al. | 74/606 R |
| 4,333,358 | 6/1982 | Grattapaglia | 74/606 R |
| 4,364,285 | 12/1982 | Morisawa et al. | 74/606 R |

Primary Examiner—Gary L. Smith
Assistant Examiner—Vinh Luong
Attorney, Agent, or Firm—Schwartz, Jeffery, Schwaab, Mack, Blumenthal & Evans

[57] ABSTRACT

The automatic transmission case includes a hole for allowing a tool to be inserted when tapping a hole which receives an anchor pin for a band brake and to receive an electrical connector for wiring between the inside of the transmission case and the outside thereof.

3 Claims, 1 Drawing Figure

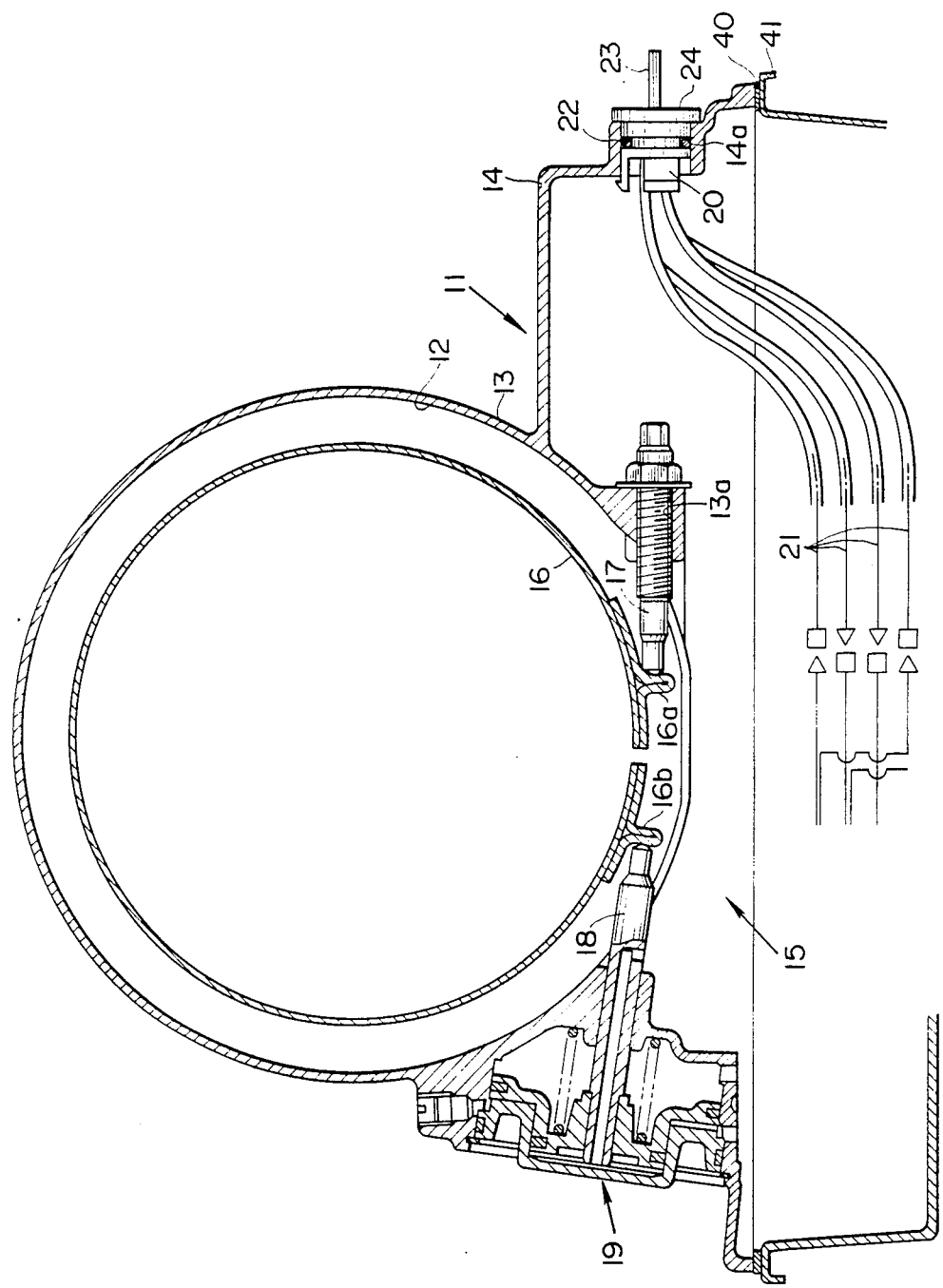

AUTOMATIC TRANSMISSION CASE

This application is a continuation of application Ser. No. 595,523, filed Mar. 30, 1984, now abandoned.

BACKGROUND OF THE INVENTION

The present invention relates to an automatic transmission case which permits wiring between electrical equipments inside the transmission case and a control circuit located outside the transmission case.

It is the conventional practice to drill a wiring hole through a transmission case at a suitable location of an annular wall defining a transmission chamber or a wall, integral with the annular transmission defining wall, on which an oil pan is mounted via a gasket in wiring electrical equipments inside the transmission case with a control unit outside of the transmission case. However, this practice is not good because a step of drilling the wiring hole is necessary and thus adds to the manufacturing cost. Another problem is that in the case of automatic transaxles now widely used for F-F (Front engine Front drive) vehicles, it is very difficult to find an area for drilling a wiring hole and the fact that a hole has to be drilled in wiring is turned out to be an objection to the miniturization of the transmission cases.

SUMMARY OF THE INVENTION

According to the present invention, a hole formed by a tool in machining a hole for threadedly receiving an anchor pin of a band brake is used in wiring when electrical connection between the inside and the outside the transmission case is necessary.

An object of the present invention is to provide an automatic transmission case which requires less manufacturing steps and is free from an objection to miniturization thereof.

BRIEF DESCRIPTION OF THE DRAWING

The single FIGURE is a transverse cross sectional view of an automatic transmission case according to the present invention.

DETAILED DESCRIPTION OF THE INVENTION

Referring to the drawing, an automatic transmission generally denoted by the reference numeral 11 includes a transmission chamber 12, a wall 13 defining the transmission chamber 12, and a wall 14, integral with the transmission chamber defining wall 13, on which an oil pan 41 is mounted via a gasket 40.

Within the transmission chamber 12, there are arranged a transmission mechanism including planetary gear sets, clucthes and brakes, only a band brake 15 being shown and denoted by the reference numeral 15. Also mounted within the transmission chamber 12 is electrical equipment, not shown, including solenoid valves used for controlling oil pressure supplied to the clutches and brakes.

The band brake 15 includes a brake band 16 having one end formed with an engagement portion 16a and the other end formed with another engagement portion 16b. The portion 16a is engaged by an anchor pin 17 threadedly engaged with the hole 13a formed through the wall 13. The other portion 16b is engaged by a rod 18 of a servo piston 19 which is securely mounted on the wall 14. When oil pressure is supplied to the piston 19, the rod 18 moves in a direction to project into the transmission chamber 12, urging the portion 16b toward the other portion 16a to decrease the diameter of the brake band 16, thus anchoring the clutch drum, not shown, enclosed by the brake band 16.

On the righthand side, as viewed in the FIGURE, of the wall 14, a hole 14a is arranged in alignment with the hole 13a threadedly receiving the anchor pin 17. The hole 14a is formed for the purpose of machining the hole 13a. The hole 14a is drilled by a tool before the hole 13a is machined by the same tool.

The hole 14a is closed by a terminal 20 and sealed in a liquid tight manner by a seal element 22. Leads from the various electrical equipment disposed in the transmission chamber 12 are connected to the terminal 20. A connector 24 to which a lead 23 from an electrical equipment, such as a control unit, disposed outside the transmission case 11, is detachably coupled with the terminal 20. When they are coupled, electrical connections between the electrical equipment is established through the transmission case 11.

It will now be appreciated from the above description that since it has been unnecessary to a wiring hole, the machining steps have been decreased and the objection to the miniturization of the transmission case has been removed.

Since the hole 14a is sealed in a liquid tight manner by the terminal 20, there is no possibility that the lubricant oil within the transmission case 11 leaks through the hole 14a.

What is claimed is:

1. A combination comprising:
   an automatic transmission case including a first wall defining a transmission chamber and a second wall integral with the first wall, said automatic transmission case being formed with a threaded first hole in said first wall, a band brake, a threaded anchor pin for said band brake being received in said threaded first hole, said anchor pin having a first end terminating within said transmission chamber, and a second end terminating between said first and second walls and a second hole which formed in said second wall and is arranged in alignment with said first hole; and
   means for establishing an electrical connection passing through the second hole of the automatic transmission case in a liquid tight manner, the means including an electrical element received in said second hole and a seal between said electrical element and said second wall for sealably closing said second hole in a liquid tight manner.

2. The combination as claimed in claim 1, wherein said electrical element includes a terminal.

3. The combination as claimed in claim 1, including an oil pan securely mounted on said second wall.

* * * * *